United States Patent [19]

Proctor

[11] Patent Number: 4,528,943

[45] Date of Patent: Jul. 16, 1985

[54] FARROWING CRATES

[76] Inventor: Keith Proctor, The Grove, Greenhill, So. Littleton, Evesham, Worcestershire, England

[21] Appl. No.: 560,263

[22] Filed: Dec. 12, 1983

[30] Foreign Application Priority Data

Dec. 11, 1982 [GB] United Kingdom ............... 8235396

[51] Int. Cl.$^3$ .............................................. A01K 1/02
[52] U.S. Cl. ................................................... 119/20
[58] Field of Search ....................... 119/15, 16, 20, 98, 119/99, 96, 103

[56] References Cited

U.S. PATENT DOCUMENTS

| | | |
|---|---|---|
| 3,084,668 | 4/1963 | McMurray et al. ............... 119/20 |
| 3,106,188 | 10/1963 | McMurray ........................... 119/20 |
| 3,237,600 | 3/1966 | Behrens et al. ..................... 119/20 |
| 4,006,715 | 2/1977 | Redmon et al. .................... 119/20 |
| 4,145,993 | 3/1979 | Notarianni et al. ................. 119/20 |
| 4,177,762 | 12/1979 | Borcherding ....................... 119/20 |
| 4,287,855 | 9/1981 | Gibson ............................... 119/20 |
| 4,351,272 | 9/1982 | McDonald .......................... 119/20 |

FOREIGN PATENT DOCUMENTS 2126790 12/1972 Fed. Rep. of Germany ........ 119/20

*Primary Examiner*—Hugh R. Chamblee
*Attorney, Agent, or Firm*—Young & Thompson

[57] ABSTRACT

The crate comprises two side members, a front member in the form of a trough assembly and a back member in the form of a rear gate for confining a sow within the crate in such a manner as to allow only limited movement of the sow. Each side member consists of a fixed retainer frame and a pivotable retainer frame pivoted on an upper rail of the fixed retainer frame so that the bottom rail of the pivotable retainer frame is movable outwardly to a limited extent when the sow applies her weight to it so as to enable the sow to lie down within the crate while being supported by the bottom rail. Pivotal movement of the two pivotable retainer frames is damped by a damper so that the sow is lowered to the ground in a controlled manner, and the two pivotable retainer frames are coupled together so that outward movement of one of the bottom rails will cause corresponding outward movement of the other bottom rail.

11 Claims, 5 Drawing Figures

FARROWING CRATES

BACKGROUND TO THE INVENTION

This invention relates to farrowing crates for use by pig farmers to confine a sow during and after farrowing so as to lessen the risk of a piglet being accidentally crushed by the sow.

A conventional farrowing crate comprises a rigid elongate frame having three or more side rails on each side, a trough at one end and a removable rear gate at the other end. The distances between the ends and sides of the crate are such as to allow only limited movement of a sow within the crate, and in particular are such that the sow is not able to turn round in the crate, whilst enabling the sow to lie down on her side within the crate to suckle her piglets. However, it has been found that a substantial number of piglets are still lost by being accidentally crushed by the sow in use of such a crate even though the sow is confined in her movements. Also it is frequently the case that, when a sow lies down on her side in the crate, her upper drills are pressed against the bottom rail on one side of the crate and this prevents the piglets having access to these drills.

It is an object of the invention to provide an entirely novel form of farrowing crate which is more efficient in use than conventional farrowing crates.

SUMMARY OF THE INVENTION

According to the invention there is provided a farrowing crate comprising two side members, a front member and a back member for confining a sow within the crate in such a manner as to allow only limited movement of the sow, at least a lower portion of at least one of the side members being movable outwardly to a limited extent when the sow applies her weight to it so as to enable the sow to lie down within the crate whilst being supported by the lower portion. The arrangement is preferably such that the movable lower portion gives way gradually as the sow leans against it whilst in the act of lying down.

In use of such a farrowing crate the sow is closely confined at all times and is provided with additional support whilst lying down so that the risk of a piglet being crushed as the sow falls on to her side in an uncontrolled manner is substantially reduced.

In a development of the invention lower portions of both side members are movable outwardly to a limited extent, and are coupled together such that outward movement of the lower portion of one of the side members causes corresponding outward movement of the lower portion of the other side member. This decreases the possibility of access to the sow's upper drills being blocked by the lower portion of one of the side members.

The or each side member may include a member which is pivotable through a limited angle about a horizontal axis and a lower portion of which constitutes the movable lower portion of the side member. In a preferred embodiment the pivotable member comprises a frame having a bottom rail constituting the movable lower portion of the side member and two uprights pivoted at points intermediate their ends on a fixed rail of the side member so as to enable the frame to be pivoted through a limited angle about said fixed rail.

Preferably the movable lower portion of the or each side member incorporates an inwardly projecting part for supporting the sow from below as she lies down within the crate. This provides control of vertical descent of the sow's body.

The movable lower portion of the or each side member is conveniently coupled to damping means, such as a hydraulic damper, which is arranged to heavily damp outward movement of the lower portion so that the lower portion gives way gradually under the sow's weight whilst damping return movement of the lower portion only lightly or not at all. Where the lower portions of both side members are movable outwardly, a single damping member may be used to damp movement of the lower portions of both side members.

In a preferred embodiment of the invention the farrowing crate comprises two side members, each including a fixed frame having two uprights and at least two rails extending between the uprights and a pivotable frame having two uprights, a bottom rail and a top rail, the two uprights of each pivotable frame being pivoted at points intermediate their ends on the upper rail of the associated fixed frame and the pivotal frames being coupled together, whereby the bottom rails of the pivotable frames are movable outwardly to a limited extent, movement of either of the bottom rails causing corresponding movement of the other bottom rail, damping means for damping outward movement of the bottom rails of the pivotable frames, a front member incorporating a trough, and a back member which is capable of being opened or removed to allow access to the crate. The crate may also include a top retainer frame which is attached to the fixed frames of the two side members.

The invention also provides a fitment for a farrowing crate having two side members, a front member and a back member for confining a sow within the crate in such a manner as to allow only limited movement of the sow, the fitment comprising at least one movable member adapted to be fitted to the crate so as to provide at least one lower side portion which is movable outwardly when the sow applies her weight to it so as to enable the sow to lie down within the crate whilst being supported by the lower side portion. Such a fitment enables a conventional farrowing crate to be modified so as to transform it into a crate in accordance with the invention, this modification possibly entailing removal of parts of one or both side members of the crate.

BRIEF DESCIPTION OF THE DRAWINGS

In order that the invention may be more fully understood, a farrowing crate in accordance with the invention will now be described, by way of example, with reference to the accompanying drawings, in which.

DETAILED DESCRIPTION OF THE DRAWINGS

Figure 1:
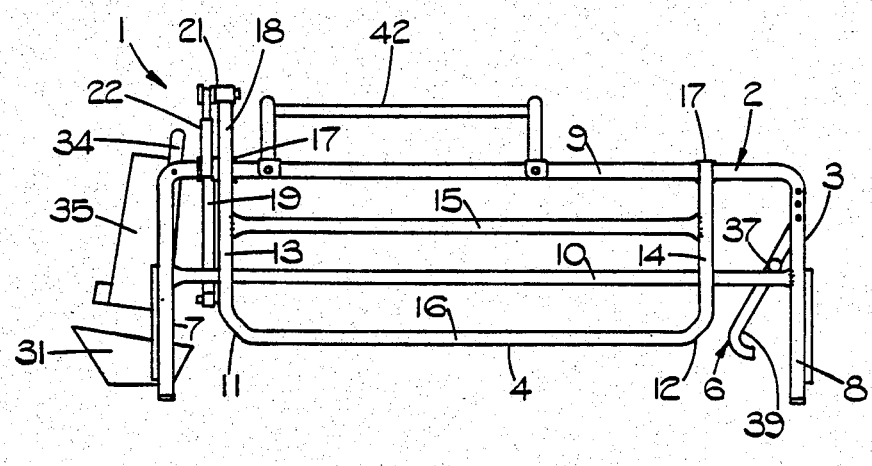
FIG. 1 is a view of the crate from one side.

The illustrated crate 1 comprises two side members 2, each including a fixed retainer frame 3 and a pivotable retainer frame 4, a front member in the form of a trough assembly 5 and a back member in the form of a rear gate 6. The fixed retainer frame 3 of each side member 2 comprises front and rear uprights 7 and 8 and upper and lower rails 9 and 10 extending between the uprights 7 and 8. The pivotable retainer frame 4 of each side member 2 has front and rear uprights 13 and 14 and top and bottom rails 15 and 16 extending between the uprights 13 and 14. The two uprights 13 and 14 of each pivotable retainer frame 4 are pivoted on the upper rail 9 of the associated fixed retainer frame 3 by pivotal connections 17. The lower portions 11 and 12 of the front and rear uprights 13 and 14 project inwardly (see FIGS. 3 and 4) so that the bottom rails 16 are disposed inwardly of the fixed retainer frames 3 in the closed position shown in FIGS. 1 to 3. The distance between the rails 16 is intended to be narrower than the sow's body. Except where otherwise stated or shown, all parts are connected together by welding and the main constructional parts are constructed from heavy gauge tubing.

The front upright 13 of one of the pivotable retainer frames 4 includes a straight extension part 18 extending above the upper rail 9 of the associated fixed retainer frame 3, and an L-shaped bar 19 is pivotally coupled to the front upright 13 of the other pivotable retainer frame 4 at the top of the lower portion 11. When the pivotable retainer frames 4 are in the closed position (FIG. 3) one arm of the L-shaped bar 19 extends parallel to the front upright 13 of the adjacent pivotable retainer frame 4, and the other arm extends parallel to the ground. The free end of the part 18 is pivotally connected to an intermediate portion of the bar 19 so as to ensure that, when the bottom rail 16 of one of the pivotable retainer frames 4 is moved outwardly so as to pivot that frame 4 into an open position as shown in FIG. 4 for example, the other pivotable retainer frame 4 is caused to pivot so as to move the bottom rail 16 of that frame 4 outwardly by a corresponding amount.

Figure 5:
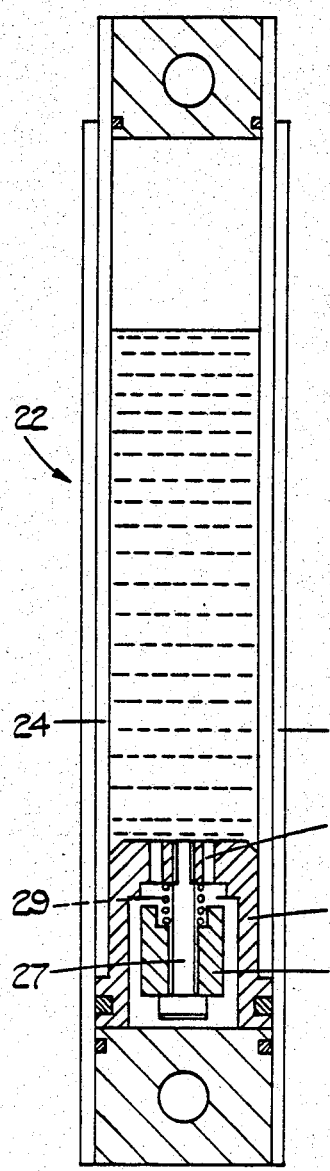
FIG. 5 is a longitudinal section through a damper constituting part of the crate.

A hydraulic damper 22 extends between a pivotal mounting 20 on the upper rail 9 of one of the fixed retainer frames 3 and a pivotal mounting 21 on the free end of the bar 19. As will be appreciated by referring to FIG. 5 which shows a longitudinal section through the damper 22, the damper 22 comprises two sleeves 23 and 24 fitted one within the other. The inner sleeve 24 is fitted at one end with a piston 25 which engages the inner wall of the outer sleeve 23 in a fluid-tight manner and is slidable within the outer sleeve 24. The piston 25 has a series of apertures 26 arranged in an annular configuration extending there-through, and includes a bolt 27 having its end threaded into a screwthreaded axial hole in the piston 25. A collar 28 is mounted on the bolt 27 and is slidable along the shaft of the bolt 27 against the action of a control spring 29 disposed between the slidable collar 28 and the body of the piston 25. The space within the sleeves 23 and 24 is filled with water with the exception of the upper part of this space which contains trapped air. When the damper 22 is fully compressed, as shown in FIG. 5, the trapped air is at a pressure of approximately 3 bars.

Figure 3:
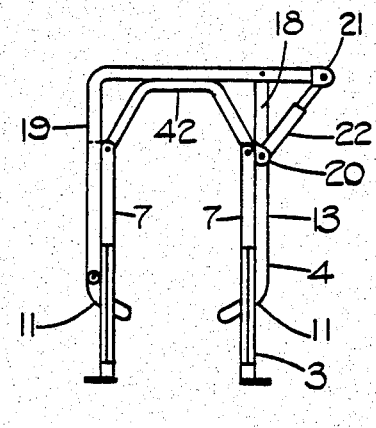
FIGS. 3 and 4 are views of the crate from the front, respectively in a closed state and an open state, with the trough assembly and rear gate removed in order to render the figures easier to read.
Figure 4:
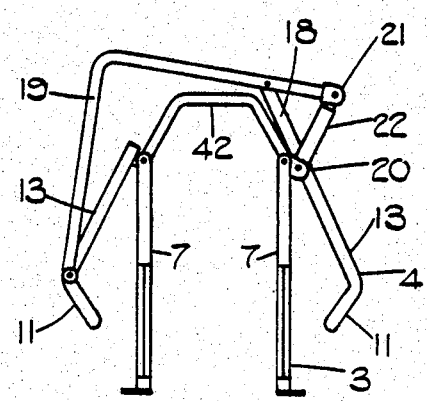

The damper 22 is intended to damp outward movement of the bottom rails 16 of the pivotable retainer frames 4 from the closed position shown in FIG. 3 to the open position shown in FIG. 4 in such a manner that the degree of damping increases with the force applied to the rails 16 and the rate of increase of this force, whilst enabling the rails 16 to move back freely towards the closed position on release of the applied force. As will be seen by referring to FIG. 4, the damper 22 is fully compressed when the rails 16 are in the fully open position. In the absence of a force applied to the rails 16, the weight of the pivotable retainer frames 4 will cause the damper 22 to be extended with the sleeve 24 and piston 25 sliding within the sleeve 23 and the water being forced through the apertures 26 in the piston 25 into the space below the piston 25, the additional space so formed in the upper part of the sleeve 23 being taken up by expansion of the trapped air. Thus the rails 16 may move back towards the closed position whilst only being lightly damped by the damper 22.

On the other hand, when the rails 16 are in the fully closed position as shown in FIG. 3 and an outward force of a sufficient magnitude is applied to one or both of the rails 16, the damper 22 will be compressed from its extended position with the sleeve 24 and piston 25 sliding within the sleeve 23 in the opposite direction, and water is forced through the apertures 26 in the piston 25 from the space below the piston 25. However, the pressure of the water in the space below the piston 25 will also act on the slidable collar 28 and will tend to force this upwardly against the action of the control spring 29. The result of this will be that the collar 28 will restrict the flow of water through the apertures 26, thus increasing the damping action of the damper 22. The degree to which the control spring 29 is depressed by the collar 28 and hence the resistance to flow of water passing through the apertures 26 in the piston 25 is dependant on the applied force and the velocity of flow of water through the apertures 26. Thus the damper 22 is velocity-conscious and sudden outward movements of the rails 16 will tend to be damped much more heavily than gradual outward movements of the rails 16.

In the described embodiment the damper 22 itself limits outward movement of the bottom rails 16 of the frames 4. However, in a variant of this embodiment, an adjustment rod (not shown) may be provided having one end pivotally mounted on one of the top rails 15 and having its other end located between two guides on the other top rail 15. A pin may be fitted into any one of a number of holes spaced along the rod in the vicinity of its other end and serves as an adjustable stop which is engaged by the adjacent top rail 15 to limit outward movement of the bottom rails 16 of the frames 4. The trough assembly 5 comprises a trough 31 made from metal sheet which is mounted on the crate 1 by means of two cross-bars such as 32 (FIG. 2) and two support bars such as 34 (FIG. 3) extending downwardly from opposite ends of the upper cross-bar 32 and supporting the two ends of the trough 31. A shield 35 made from metal sheet is also mounted between the two support bars 34.

Figure 2:
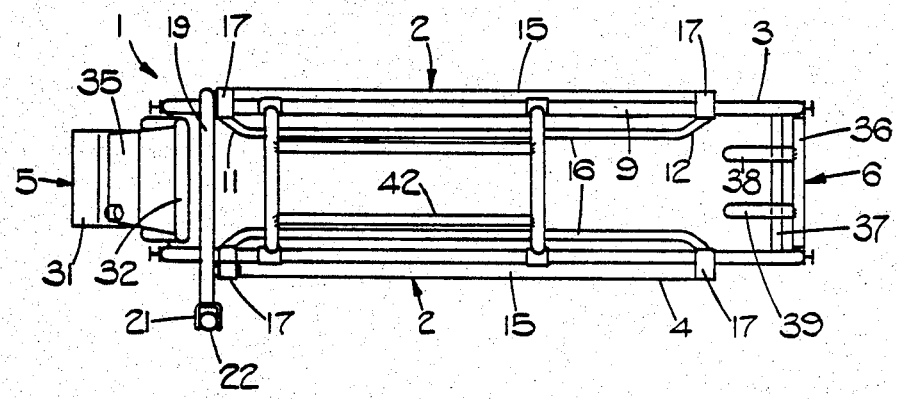
FIG. 2 is a view of the crate from above.

The rear gate 6 comprises two cross-bars 36 and 37 and two rump bars 38 and 39 extending downwardly from the upper cross-bar 36 and crossing the lower cross-bar 37, as shown in FIGS. 1 and 2. The cross-bar 36 extends between the rear uprights 8 of the fixed retainer frames 3, and the ends of the cross-bar 37 are engageable with the lower rails 10 of the fixed retainer frames 3. The ends of the cross-bar 36 are mounted on the rear uprights 8 so as to enable the gate 6 to be lifted and pivoted to open the gate 6 outwardly or to adjust the position of the gate 6 by mounting the ends of the cross-bar 36 at a different height relative to the rear uprights 8. A top retainer frame 42 extends between the upper rails 9 of the fixed retainer frames 3.

In use of the farrowing crate 1, a sow is introduced into the crate 1 by way of the gate 6 and is confined therein with her head towards the front of the crate 1. When the sow lies down within the crate to suckle her piglets her weight will bear against the inturned rails 16 of the pivotable retainer frames 4, thus tending to pivot these rails 16 outwardly. Since the distance between the rails 16 in the closed position is less than the width of the sow's body, any movement of the sow such as to lower her body towards the ground will cause corresponding outward pivoting of the pivotable retainer frames 4. Furthermore the rails 16 will give way only gradually under the sow's weight due to the action of the damper 22 so that the sow is supported by the rails 16 whilst lying down and the risk of a piglet being crushed as the sow falls on to her side is substantially reduced. In view of the form of the damper 22 previously described, the rails 16 are movable outwardly relatively easily when pushed against by the sow relatively lightly, but are heavily damped when acted upon by the full weight of the sow, for example when the sow falls over on to her side, with the result that the sow is lowered to the ground in a controlled manner.

If the sow lies down in such a manner as to apply her weight against only one of the two rails 16, the associated pivotable retainer frame 4 will pivot outwardly and the opposite pivotable retainer frame 4 will also be cuased to pivot by a corresponding amount due to the action of the coupling, comprising the part 18 and the bar 19, extending between the two frames 4, thereby lifting the opposite bottom rail 16 clear of the sow's upper drills and providing free access to these drills. Should the sow shift her position whilst lying down in such a manner as to move her back away from the bottom rail 16 supporting her back, the rail 16 will immediately move inwardly so as to regain contact with her back. Thus the sow is able to lie down comfortably within the crate and may shift around to a limited extent without danger to her piglets and without suffering unnecessary anxiety due to discomfort.

In a non-illustrated modification of the above-described farrowing crate, only the rear portion of each pivotable retainer frame 4 is movable outwardly. The top rail 15 and front upright 13 of each frame 4 is dispensed with, and the bottom rail 16 is pivotally connected at one end to the rear upright 14 and at the other end to the front upright 7 of the associated fixed retainer frame 3. Furthermore the coupling constituted by the part 18 and the bar 19 acts between the rear uprights 14. Other constructions are possible in which a rear portion of each side wall is pivotable outwardly.

I claim:

1. A farrowing crate comprising two side members each including a fixed frame having two uprights and at least two rails extending between the uprights and a privotable frame having two uprights, a bottom rail and a top rail, the two uprights of each pivotable frame being pivoted at points intermediate their ends on the upper rail of the associated fixed frame and the pivotal frames being coupled together, whereby the bottom rails of the pivotable frames are movable outwardly to a limited extent, and the bottom rails are coupled together so that movement of either of the bottom rails causing corresponding movement of the other bottom rail, damping means for damping outward movement of the bottom rails of the pivotable frames, a front member incorporating a trough, and a back member which is capable of being opened or removed to allow access to the crate.

2. A farrowing crate according to claim 1, wherein the movable lower portion of each side member incorporates an inwardly projecting part for supporting the sow from below as she lies down within the crate.

3. A farrowing crate comprising two side members, a front member and a back member for confining a sow within the crate in such a manner as to allow only limited movement of the sow, wherein the lower portion of each side member is movable outwardly to a limited extent when the sow applies her weight to it so as to enable the sow to lie down within the crate whilst being supported by the lower portion, and the lower portions of the two side members are coupled together such that outward movement of the lower portion of one of the side members causes corresponding outward movement of the lower portion of the other side member.

4. A farrowing crate according to claim 3, wherein each side member includes a member which is pivotable through a limited angle about a horizontal axis and a lower portion of which constitutes the movable lower portion of the side member.

5. A farrowing crate according to claim 4, wherein the pivotable member comprises a frame having a bottom rail constituting the movable lower portion of the side member, and two uprights pivoted at points intermediate their ends on a fixed rail of the side member so as to enable the frame to be pivoted through a limited angle about said fixed rail.

6. A farrowing crate according to claim 3, wherein the movable lower portion of each side member is coupled to damping means for heavily damping outward movement of the lower portion so that the lower portion gives way gradually under the sow's weight.

7. A farrowing crate according to claim 6, wherein the damping action of the damping means is such that the resistance to inward movement of each lower portion is relatively slight.

8. A farrowing crate according to claim 6, wherein the damping action of the damping means relies on forcing fluid through a constriction the throughflow cross-section of which is decreased when a sudden force is applied to the damping means, whereby each lower portion is movable outwardly relatively easily when pushed against by the sow relatively lightly, but is heavily damped when acted upon by the full weight of the sow.

9. A farrowing crate according to claim 8, wherein the damping means incorporates a piston having at lest one aperture extending therethrough and a member movable by fluid pressure against the action of a spring to vary the throughflow cross-section through the piston.

10. A fitment for a farrowing crate having two side members, a front member and a back member for confining a sow within the crate in such a manner as to allow only limited movement of the sow, the fitment being constituted by an assembly comprising two movable members adapted to be fitted to respective side members of the crate so as to provide on each side of the crate a respective lower side portion which is movable outwardly when the sow applies her weight to it so as to enable the sow to lie down within the crate whilst being supported by the lower side portion, and a coupling member coupling together the two movable members such that outward movement of one lower side portion causes corresponding outward movement of the other lower side portion.

11. A farrowing crate comprising two side members, a front member and a back member for confining a sow within the crate in such a manner as to allow only limited outward movement of the sow, at least a lower portion of at least one of the side members being movable outwardly, damper means to retard said outward movement in such a manner as to give way gradually under the weight of the sow so as to enable the sow to lie down within the crate whilst being supported by the lower portion, and the or each movable lower portion incorporating a bottom rail which projects inwardly below the body of the sow when the sow is standing within the crate, said bottom rail yieldably supporting the body of the sow from below as the sow lies down within the crate, whereby said damper means and said bottom rail retard vertical descent of the body of the sow.

* * * * *